(12) United States Patent
Westra et al.

(10) Patent No.: US 9,079,554 B2
(45) Date of Patent: Jul. 14, 2015

(54) METHOD AND APPARATUS FOR VEHICLE HARDWARE THEFT PREVENTION

(71) Applicant: Ford Global Technologies, LLC, Dearborn, MI (US)

(72) Inventors: Michael Raymond Westra, Plymouth, MI (US); Chad Evert Esselink, Canton, MI (US); Uwe Zank, Pulheim (DE); Simon John Hurr, Grays Essex (GB)

(73) Assignee: Ford Global Technologies, LLC, Dearborn, MI (US)

(*) Notice: Subject to any disclaimer, the term of this patent is extended or adjusted under 35 U.S.C. 154(b) by 78 days.

(21) Appl. No.: 14/071,704

(22) Filed: Nov. 5, 2013

(65) Prior Publication Data

US 2014/0058631 A1    Feb. 27, 2014

Related U.S. Application Data

(62) Division of application No. 13/206,094, filed on Aug. 9, 2011, now Pat. No. 8,849,519.

(51) Int. Cl.

| | |
|---|---|
| *B60R 25/01* | (2013.01) |
| *B60R 25/102* | (2013.01) |
| *B60R 25/00* | (2013.01) |
| *B60R 25/20* | (2013.01) |
| *G06F 21/44* | (2013.01) |
| *G06F 21/88* | (2013.01) |
| *B60R 25/24* | (2013.01) |
| *G06F 21/31* | (2013.01) |

(52) U.S. Cl.
CPC .............. *B60R 25/01* (2013.01); *B60R 25/00* (2013.01); *B60R 25/102* (2013.01); *B60R 25/2018* (2013.01); *B60R 25/24* (2013.01); *G06F 21/44* (2013.01); *G06F 21/88* (2013.01); *B60R 25/241* (2013.01); *B60R 2325/202* (2013.01); *G06F 21/31* (2013.01); *H04L 2209/84* (2013.01)

(58) Field of Classification Search
None
See application file for complete search history.

(56) References Cited

U.S. PATENT DOCUMENTS

| | | |
|---|---|---|
| 4,543,569 A | 9/1985 | Karlstrom |
| 5,081,667 A | 1/1992 | Drori et al. |
| 5,467,070 A | 11/1995 | Drori et al. |

(Continued)

FOREIGN PATENT DOCUMENTS

| | | |
|---|---|---|
| CN | 1834832 A | 9/2006 |
| CN | 1863052 | 11/2006 |

(Continued)

OTHER PUBLICATIONS

Chinese Patent and Trademark Office, First Office Action for the corresponding Chinese Patent Application No. 201210280045.X mailed Dec. 31, 2014.

(Continued)

*Primary Examiner* — Jason Holloway
(74) *Attorney, Agent, or Firm* — Jennifer M. Stec; Brooks Kushman P.C.

(57) ABSTRACT

A computer-implemented method includes determining that an infotainment system has been activated. The method further includes accessing a vehicle network containing at least a unique vehicle identifier. The method additionally includes comparing the unique vehicle identifier to a stored vehicle identifier. The method further includes permitting access to the infotainment system only if the unique vehicle identifier matches the stored vehicle identifier.

12 Claims, 3 Drawing Sheets

(56) References Cited

U.S. PATENT DOCUMENTS

| | | | |
|---|---|---|---|
| 5,513,107 A | 4/1996 | Gormley | |
| 5,627,510 A | 5/1997 | Yuan | |
| 5,635,916 A | 6/1997 | Bucholtz et al. | |
| 5,655,081 A | 8/1997 | Bonnell et al. | |
| 5,734,336 A | 3/1998 | Smithline | |
| 5,776,031 A | 7/1998 | Minowa et al. | |
| 5,828,319 A | 10/1998 | Tonkin et al. | |
| 5,874,889 A | 2/1999 | Higdon et al. | |
| 5,959,540 A | 9/1999 | Walter | |
| 6,018,291 A | 1/2000 | Marble et al. | |
| 6,133,825 A | 10/2000 | Matsuoka | |
| 6,177,866 B1 | 1/2001 | O'Connell | |
| 6,198,996 B1 | 3/2001 | Berstis | |
| 6,263,282 B1 | 7/2001 | Vallancourt | |
| 6,268,804 B1 | 7/2001 | Janky et al. | |
| 6,271,745 B1 | 8/2001 | Anzai et al. | |
| 6,282,226 B1 | 8/2001 | Furukawa | |
| 6,434,455 B1 | 8/2002 | Snow et al. | |
| 6,434,486 B1 | 8/2002 | Studt et al. | |
| 6,438,491 B1 | 8/2002 | Farmer | |
| 6,539,078 B1 | 3/2003 | Hunt et al. | |
| 6,574,734 B1 | 6/2003 | Colson et al. | |
| 6,590,495 B1 | 7/2003 | Behbehani | |
| 6,668,221 B2 | 12/2003 | Harter, Jr. et al. | |
| 6,679,702 B1 | 1/2004 | Rau | |
| 6,690,260 B1 | 2/2004 | Ashihara | |
| 6,731,195 B2 * | 5/2004 | Nemoto | 340/5.2 |
| 6,737,963 B2 | 5/2004 | Gutta et al. | |
| 6,754,562 B2 | 6/2004 | Strege et al. | |
| 6,785,542 B1 | 8/2004 | Blight et al. | |
| 6,810,309 B2 | 10/2004 | Sadler et al. | |
| 6,853,919 B2 | 2/2005 | Kellum | |
| 6,859,718 B2 | 2/2005 | Fritz et al. | |
| 6,871,145 B2 | 3/2005 | Altan et al. | |
| 6,906,619 B2 | 6/2005 | Williams et al. | |
| 6,927,676 B2 | 8/2005 | Edens et al. | |
| 6,941,194 B1 | 9/2005 | Dauner et al. | |
| 7,057,501 B1 | 6/2006 | Davis | |
| 7,075,409 B2 | 7/2006 | Guba | |
| 7,102,496 B1 | 9/2006 | Ernst, Jr. et al. | |
| 7,124,027 B1 | 10/2006 | Ernst, Jr. et al. | |
| 7,131,005 B2 * | 10/2006 | Levenson et al. | 713/170 |
| 7,148,790 B2 | 12/2006 | Aoyama et al. | |
| 7,161,563 B2 | 1/2007 | Vitale et al. | |
| 7,173,903 B2 | 2/2007 | Remboski et al. | |
| 7,194,069 B1 | 3/2007 | Jones et al. | |
| 7,207,041 B2 | 4/2007 | Elson et al. | |
| 7,228,213 B2 | 6/2007 | Sakai et al. | |
| 7,246,062 B2 | 7/2007 | Knott et al. | |
| 7,266,438 B2 | 9/2007 | Kellum et al. | |
| 7,312,691 B2 * | 12/2007 | Zambo et al. | 340/5.72 |
| 7,337,113 B2 | 2/2008 | Nakagawa et al. | |
| 7,340,332 B2 | 3/2008 | Underdahl et al. | |
| 7,356,394 B2 | 4/2008 | Burgess | |
| 7,366,892 B2 | 4/2008 | Spaur et al. | |
| 7,375,620 B2 | 5/2008 | Balbale et al. | |
| 7,391,305 B2 | 6/2008 | Knoll et al. | |
| 7,484,008 B1 | 1/2009 | Gelvin et al. | |
| 7,565,230 B2 | 7/2009 | Gardner et al. | |
| 7,602,782 B2 | 10/2009 | Doviak et al. | |
| 7,783,475 B2 | 8/2010 | Neuberger et al. | |
| 7,812,712 B2 | 10/2010 | White et al. | |
| 7,862,945 B2 | 1/2011 | Saito et al. | |
| 8,050,817 B2 | 11/2011 | Moinzadeh et al. | |
| 8,050,863 B2 | 11/2011 | Trepagnier et al. | |
| 8,089,339 B2 | 1/2012 | Mikan et al. | |
| 8,232,864 B2 | 7/2012 | Kakiwaki | |
| 8,237,554 B2 | 8/2012 | Miller et al. | |
| 8,258,939 B2 | 9/2012 | Miller et al. | |
| 8,301,108 B2 | 10/2012 | Naboulsi | |
| 8,305,189 B2 | 11/2012 | Miller et al. | |
| 8,311,722 B2 | 11/2012 | Zhang et al. | |
| 8,798,852 B1 * | 8/2014 | Chen et al. | 701/32.6 |
| 2001/0021891 A1 | 9/2001 | Kusafuka et al. | |
| 2002/0013650 A1 | 1/2002 | Kusafuka et al. | |
| 2002/0031228 A1 | 3/2002 | Karkas et al. | |
| 2002/0096572 A1 | 7/2002 | Chene et al. | |
| 2002/0097145 A1 | 7/2002 | Tumey et al. | |
| 2003/0004730 A1 | 1/2003 | Yuschik | |
| 2003/0055643 A1 | 3/2003 | Woestemeyer et al. | |
| 2003/0079123 A1 | 4/2003 | Mas Ribes | |
| 2003/0217148 A1 | 11/2003 | Mullen et al. | |
| 2003/0220725 A1 | 11/2003 | Harter, Jr. et al. | |
| 2003/0231550 A1 | 12/2003 | Macfarlane | |
| 2004/0046452 A1 | 3/2004 | Suyama et al. | |
| 2004/0073367 A1 | 4/2004 | Altan et al. | |
| 2004/0088205 A1 | 5/2004 | Geisler et al. | |
| 2004/0124968 A1 | 7/2004 | Inada et al. | |
| 2004/0176906 A1 | 9/2004 | Matsubara et al. | |
| 2004/0227642 A1 | 11/2004 | Giles et al. | |
| 2004/0236475 A1 | 11/2004 | Chowdhary | |
| 2005/0021597 A1 | 1/2005 | Derasmo et al. | |
| 2005/0033517 A1 | 2/2005 | Kondoh et al. | |
| 2005/0125110 A1 | 6/2005 | Potter et al. | |
| 2005/0134115 A1 | 6/2005 | Betts, Jr. et al. | |
| 2005/0177635 A1 | 8/2005 | Schmidt et al. | |
| 2005/0190039 A1 | 9/2005 | Aoyama | |
| 2005/0193212 A1 | 9/2005 | Yuhara | |
| 2005/0261816 A1 | 11/2005 | DiCroce et al. | |
| 2006/0056663 A1 | 3/2006 | Call | |
| 2006/0142917 A1 | 6/2006 | Goudy | |
| 2006/0150197 A1 | 7/2006 | Werner | |
| 2006/0156315 A1 | 7/2006 | Wood et al. | |
| 2006/0202799 A1 * | 9/2006 | Zambo et al. | 340/5.72 |
| 2006/0220904 A1 | 10/2006 | Jarlengrip | |
| 2006/0250224 A1 | 11/2006 | Steffel et al. | |
| 2006/0293813 A1 | 12/2006 | Nou | |
| 2007/0027595 A1 | 2/2007 | Nou | |
| 2007/0050854 A1 | 3/2007 | Cooperstein et al. | |
| 2007/0072616 A1 | 3/2007 | Irani | |
| 2007/0100514 A1 | 5/2007 | Park | |
| 2007/0103339 A1 | 5/2007 | Maxwell et al. | |
| 2007/0255568 A1 | 11/2007 | Pennock | |
| 2008/0070616 A1 | 3/2008 | Yun | |
| 2008/0109653 A1 | 5/2008 | Yokohama | |
| 2008/0148374 A1 | 6/2008 | Spaur et al. | |
| 2008/0150683 A1 | 6/2008 | Mikan et al. | |
| 2008/0275604 A1 * | 11/2008 | Perry et al. | 701/33 |
| 2009/0030605 A1 | 1/2009 | Breed | |
| 2009/0045928 A1 | 2/2009 | Rao et al. | |
| 2009/0096596 A1 | 4/2009 | Sultan et al. | |
| 2009/0167524 A1 | 7/2009 | Chesnutt et al. | |
| 2009/0184800 A1 | 7/2009 | Harris | |
| 2009/0190735 A1 | 7/2009 | Gilmartin et al. | |
| 2009/0195370 A1 | 8/2009 | Huffman et al. | |
| 2009/0275281 A1 | 11/2009 | Rosen | |
| 2009/0287499 A1 * | 11/2009 | Link, II | 705/1 |
| 2009/0309703 A1 | 12/2009 | Bevacqua et al. | |
| 2010/0004818 A1 | 1/2010 | Phelan | |
| 2010/0007479 A1 | 1/2010 | Smith | |
| 2010/0013596 A1 | 1/2010 | Kakiwaki | |
| 2010/0030458 A1 | 2/2010 | Coughlin | |
| 2010/0039224 A1 | 2/2010 | Okude et al. | |
| 2010/0057586 A1 | 3/2010 | Chow | |
| 2010/0075656 A1 | 3/2010 | Howarter et al. | |
| 2010/0097178 A1 | 4/2010 | Pisz et al. | |
| 2010/0148923 A1 | 6/2010 | Takizawa | |
| 2010/0178872 A1 | 7/2010 | Alrabady et al. | |
| 2010/0191535 A1 | 7/2010 | Berry et al. | |
| 2010/0191973 A1 | 7/2010 | Huntzicker et al. | |
| 2010/0228404 A1 * | 9/2010 | Link et al. | 701/1 |
| 2010/0321620 A1 | 12/2010 | Tieman et al. | |
| 2011/0009107 A1 | 1/2011 | Guba et al. | |
| 2011/0071720 A1 | 3/2011 | Schondorf et al. | |
| 2011/0071725 A1 | 3/2011 | Kleve et al. | |
| 2011/0071734 A1 | 3/2011 | Van Wiemeersch et al. | |
| 2011/0102146 A1 | 5/2011 | Giron | |
| 2011/0105097 A1 | 5/2011 | Tadayon et al. | |
| 2011/0106374 A1 | 5/2011 | Margol et al. | |
| 2011/0112969 A1 | 5/2011 | Zaid et al. | |
| 2011/0148574 A1 | 6/2011 | Simon et al. | |
| 2011/0166748 A1 | 7/2011 | Schneider et al. | |
| 2011/0213629 A1 | 9/2011 | Clark et al. | |
| 2011/0215921 A1 | 9/2011 | Ben Ayed et al. | |

(56) References Cited

U.S. PATENT DOCUMENTS

| | | |
|---|---|---|
| 2011/0275321 A1 | 11/2011 | Zhou et al. |
| 2011/0295444 A1 | 12/2011 | Westra et al. |
| 2012/0041633 A1 | 2/2012 | Schunder et al. |
| 2012/0054036 A1 | 3/2012 | Nam et al. |
| 2012/0071140 A1 | 3/2012 | Oesterling et al. |
| 2012/0139760 A1 | 6/2012 | Bevacqua et al. |
| 2012/0157069 A1 | 6/2012 | Elliott et al. |
| 2012/0280786 A1 | 11/2012 | Miller et al. |
| 2012/0284702 A1 | 11/2012 | Ganapathy et al. |
| 2012/0293317 A1 | 11/2012 | Hanna et al. |
| 2012/0313768 A1 | 12/2012 | Campbell et al. |
| 2013/0005302 A1 | 1/2013 | Ozaki |
| 2013/0162421 A1 | 6/2013 | Inaguma et al. |
| 2013/0200999 A1 | 8/2013 | Spodak et al. |

FOREIGN PATENT DOCUMENTS

| | | |
|---|---|---|
| CN | 101596895 A | 12/2009 |
| DE | 102007046270 A1 | 4/2009 |
| EP | 0449471 | 10/1991 |
| EP | 0971463 | 1/2000 |
| EP | 1095527 | 5/2001 |
| JP | H04233892 A | 8/1992 |
| JP | 2008195253 | 8/2008 |
| JP | 200803630 | 12/2008 |
| KR | 20110081577 A | 2/2013 |
| RU | 2189912 C2 | 9/2002 |
| WO | WO0125572 A1 | 4/2001 |
| WO | 2009158469 | 12/2009 |
| WO | 2011047056 A1 | 4/2011 |
| WO | 2012015403 | 2/2012 |

OTHER PUBLICATIONS

Autobiometrics, Com, US Distributor for ATRD Biometric Immobilizer, http://www.autobiometrics.com, Jul. 6, 2011.

SALES@usasupremetech.com, In the U.S. a Car is Stolen Every 26 Seconds, The Wave of the Future, Biometrics Authentication, An Introduction.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

Driver Focus—Telematics Working Group, Statement of Principles, Criteria and Verification Procedures on Driver Interactions with Advanced In-Vehicle Information and Communications Systems, Including 2006 Updated Sections, Jun. 26, 2006.

The Federal Service for Intellectual Property Patents and Trademarks, Decision on Granting a Patent for Invention for the corresponding Russian Application No. 2012134107/08, Filed Aug. 9, 2012 dated Mar. 4, 2015.

* cited by examiner

METHOD AND APPARATUS FOR VEHICLE HARDWARE THEFT PREVENTION

CROSS-REFERENCE TO RELATED APPLICATIONS

This application is a division of U.S. application Ser. No. 13/206,094 filed Aug. 9, 2011, now U.S. Patent No. 8,849,519, the disclosure of which is hereby incorporated in its entirety by reference herein.

TECHNICAL FIELD

The illustrative embodiments generally relate to a method and apparatus for vehicle hardware theft prevention.

BACKGROUND

Vehicle security is a constant source of concern to owners of vehicles. From vehicle alarms, to vehicle tracking systems, numerous security measures have been developed over the years to provide protection to owners and to prevent theft.

Vehicle security systems often will produce a loud noise or alarm if the vehicle is compromised or tampered with. These alarms are designed as a deterrent, and can alert bystanders to the presence of a thief, and may serve to scare the thief away before a crime is completed. Such systems can also help reduce insurance rates and may be required to obtain the most desirable rates.

Some security systems can even alert an owner of a potential theft, or alert authorities. Due to the fact that an alerted party may take some time to arrive at the vehicle, however, theft may be complete by the time the notified party has arrived.

In some instances, theft deterrent systems may even track the location of a vehicle. This can assist in capture of a thief, and recovery of the vehicle if the vehicle itself has been stolen. If vehicle components, such as a stereo, navigation system, entertainment system, etc. are stolen, however, the tracking device may be unable to provide a vehicle location.

These components, once they have been taken from the vehicle, stand very little chance of recovery unless the thief is captured or a storehouse is found. Once they have been sold and installed into different vehicles, it may almost be impossible to discover the components and recover them. As such, if the thief acts quickly enough the thief may be able to remove some or all of the valuable components and escape. If an alarm system did not provide sufficient deterrent, there may be little else that can be done to deter a determined thief from stealing a component.

SUMMARY

In a first illustrative embodiment, a computer-implemented method includes determining that an infotainment system has been activated. The illustrative method further includes accessing a vehicle network containing at least a unique vehicle identifier.

In this embodiment, the illustrative method additionally includes comparing the unique vehicle identifier to a stored vehicle identifier. The illustrative method further includes permitting access to the infotainment system only if the unique vehicle identifier matches the stored vehicle identifier.

In a second illustrative embodiment, a computer readable storage medium, stores instructions that, when executed, cause a processor of a vehicle computing system to perform the method including determining that an infotainment system has been activated.

The illustrative method further includes accessing a vehicle network containing at least a unique vehicle identifier and comparing the unique vehicle identifier to a stored vehicle identifier. Also, the illustrative method includes permitting access to the infotainment system only if the unique vehicle identifier matches the stored vehicle identifier.

In a third illustrative embodiment, a system includes a vehicle computing system and at least one module running on the vehicle computing system. In this embodiment, the module is operable to access a vehicle network to determine if a unique vehicle identifier is present. The module is further operable to compare the unique vehicle identifier to a stored vehicle identifier. Also, the module is operable to permit access to the infotainment system only if the unique vehicle identifier matches the stored vehicle identifier.

In a fourth illustrative embodiment, a computer-implemented method includes determining that a requested upload corresponds to a procedure for unlocking a locked vehicle infotainment system. In this illustrative embodiment, the method includes verifying the authenticity of the requested upload. The illustrative method also includes activating a verified upload to unlock the locked vehicle infotainment system.

Also, in this embodiment, the method includes, responsive to the unlocking, deleting a VIN associated with the locked vehicle infotainment system. The method further includes obtaining a new VIN for association with the vehicle infotainment system, the new VIN being available on a vehicle bus in which the infotainment system is installed, and corresponding to the vehicle's VIN. Further, the method includes saving the new VIN as a VIN which must be detected upon system startup to prevent relocking of the vehicle infotainment system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
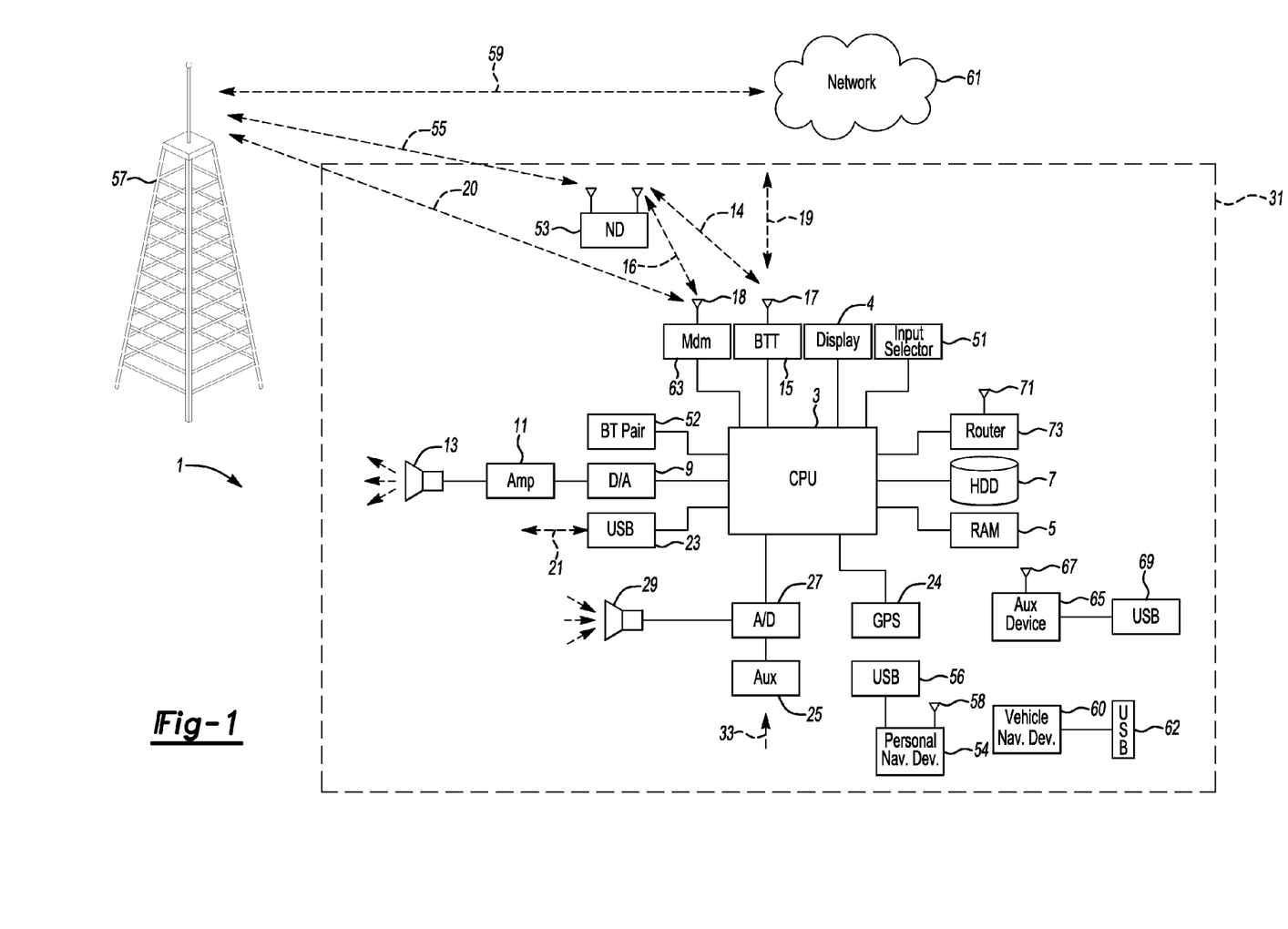
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In the illustrative embodiments, a vehicle component, such as, but not limited to, a vehicle computing system and/or vehicle infotainment system contains at least one module installed thereon that is capable of securing the module. Since vehicles have unique identification numbers, known as VINs, the module can be keyed to allow the system to operate only when installed in a vehicle whose VIN the module recognizes.

Thus, if the module is stolen and placed in a new vehicle, the module will not recognize the VIN, and will lock out the infotainment system. This should deter the theft of the systems, as they will only work in vehicles for which they were intended.

Of course, it is possible that the system will be permissibly removed, or recovered from an otherwise totaled vehicle and placed in a new vehicle with the permission of the system owner. In such an instance, the module may place the system in lockout mode. When the system is in lockout mode, however, an authorized service provider can be equipped with the capability to cause the system to begin normal operation, and re-pair itself with a new vehicle. In this manner, a system may not be rendered permanently inoperable if properly moved between vehicles.

Figures 2, 3:
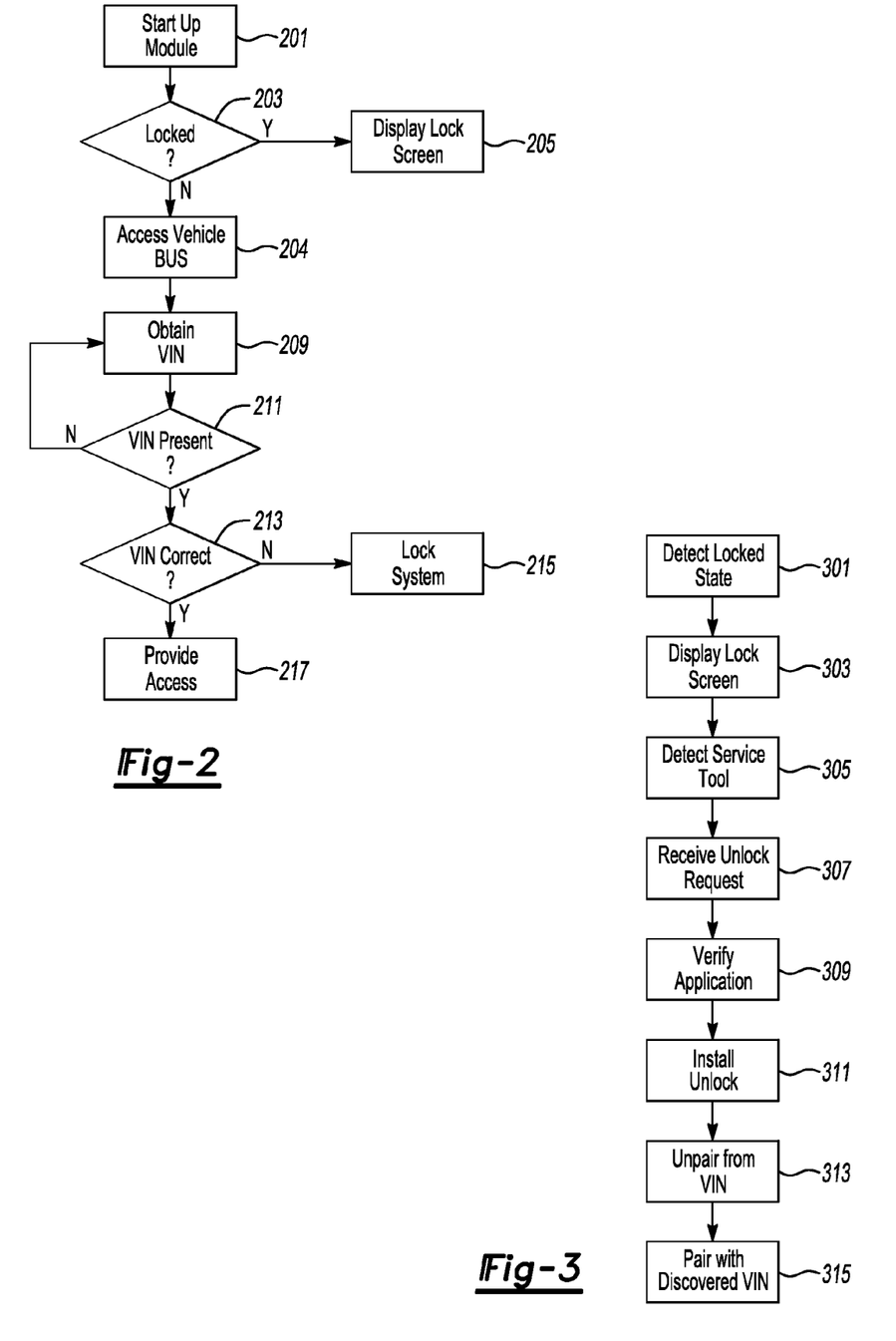
FIG. 2 shows an illustrative example of a verification process.
FIG. 3 shows an illustrative example of an unlock process.

FIG. 2 shows an illustrative example of a verification process. In this illustrative embodiment, at some point after the vehicle has been activated, such as in the case of a key-on event, the infotainment system will power up. This may cause the protection module (or similar software routine) to activated 201.

Once the module has been activated, it may first check to see if the system has already entered a lock-down state 203. An indicator that cannot be tampered with may have been set if a previous lock-down was engaged, and the module may be capable of detecting that the system is already in a state of lock-down 203. If this is the case, a screen may be displayed (or an audio output may be engaged) 205 to notify the vehicle owner that the system is currently locked and in very limited functionality mode. This display can include, but is not limited to, lock-out of non-critical functions, play-back on ignition cycle of a message that the module is not genuine, etc.

In at least one instance, the functionality is limited to the output of the lockdown message and the ability to communicate with a dealer system to disengage the locking mechanism. In at least one alternative embodiment, the original owner of the system, or a new authorized owner, may be given the ability to unlock the system through the input of a password, or through the uploading of software provided in conjunction with a request from the manufacturer. The user seeking to unlock the system may be required to provide some form of verification before an unlock capability is provided.

If the system is not currently in a lock-down mode, the module may access a vehicle network, such as, but not limited to, a CAN bus 207. Information about the vehicle, including, but not limited to, electronic VIN identification numbers, can be obtained over the CAN bus. Accessing the vehicle bus can give the module the ability to obtain a vehicle VIN 209.

If a VIN is not present 211, the module may persist in the attempts to discover the VIN. Due to a system error, the VIN may not be available (temporarily or permanently) and the vehicle manufacturer may have to determine whether a no-VIN state should result in system lockout or system accessibility. An alternative message, such as a VIN-error message, may be output to inform the user that a visit to a dealer may be required to repair the VIN-error. In at least one case, the module may allow access to the system for a limited number of times if an error occurs, before entering lockout mode. This will give an authorized user an opportunity to use the system while traveling to a dealer to have the issue repaired.

In another instance, the user may be able to input a temporary authorization code for the particular system. This can be obtained, for example, from a manufacturer or dealer. The temporary code can provide limited use of the system before lockout is entered, again giving the user time to get the vehicle to a scheduled dealer appointment. Also, with the case of a temporary authorization code obtained through provision of user credentials, the user can be assured that a thief is not simply using a stolen code to authorize the use of the system. To prevent exploitation of such a system, input of temporary codes may be limited to one or a few instances before lockout mode is entered.

If the VIN is detectable over the vehicle network 211, the module may then determine if the detected VIN is the correct VIN 213. In at least one instance, the module/system is paired to a vehicle's VIN upon completion of manufacture of the vehicle or at some point during the manufacturing process. It may be desirable to perform the pairing near the end of the process so that it is ensured that the vehicle has passed any quality control checks, but pairing can be done earlier if desired.

Once the module/system has been paired to a VIN, it is designed to only operate in conjunction with a vehicle having the same VIN number to which it is paired. This prevents stolen modules from operating in alternative vehicles. Modules/systems may also have an alternative option where they operate in conjunction with secondary VINs, such as testing VINs or alternative VINs, but in the example discussed here the module is designed to operate with a single VIN.

If the VIN is the correct VIN, the module allows the driver to access the system as usual 217. Otherwise, the module may place the system in a lock-down mode 215. As previously noted, the lockdown mode, in at least one embodiment, may only be removed through the aid of an authorized service provider. Even if a customer inadvertently purchased a stolen module, they would be prohibited from using it, and a trip to the dealer to rectify the problem would then result in recovery of the stolen module.

FIG. 3 shows an illustrative example of an unlock process. In this illustrative embodiment, the module has detected that it is in a locked state 301, and is in the process of prohibiting system access while outputting a lockout message 303. The limited system functionality may also include a list of authorized repair technicians in the area of the vehicle, and an ability to contact or direct the driver to one of the local repair technicians. This may aid in the case of inadvertent lock-out, in that the driver can still easily reach a repair technician to have the module/system unlocked.

Once the driver has reached an authorized repair location, such as a dealer or an authorized mechanic, a service tool may be connected to the vehicle through, for example, an ODB port or USB port. In at least one instance, the module is signed with an electronic serial number (ESN), providing a module specific identification serial number.

The technician, through a connected diagnostic tool or other backend system, may request the generation of a signed unlock application signed specifically to be recognized by the particular module installed in the vehicle being serviced. In other words, the application can only be used by a particular vehicle (in this instance) and cannot be used to unlock a plurality of vehicles if stolen from the dealer.

The backend system will generate a signed unlock application and provide it to the technician for installation on the vehicle. The module receives the unlock request from the service tool 307, and verifies the signature of the unlock application to be installed 309. This can be done, for example, by comparing the ESN associated with the module to the ESN associated with the unlock application.

If the unlock application has been verified as being suitable for that particular vehicle, this is presumably sufficient, in this case, to identify the provider of the application as being authorized to unlock the module/system. Other security protocol can be implemented as needed.

The unlock application is then installed/executed by the module 311, and the module is placed in an unlocked state. As part of unlocking the module, the module is unpaired from the VIN 313, so that the module does not immediately re-lock the system upon wake-up. The module then, having no paired VIN currently associated therewith, is free to re-pair itself with the VIN of the vehicle on which it is installed 315.

Figure 4:
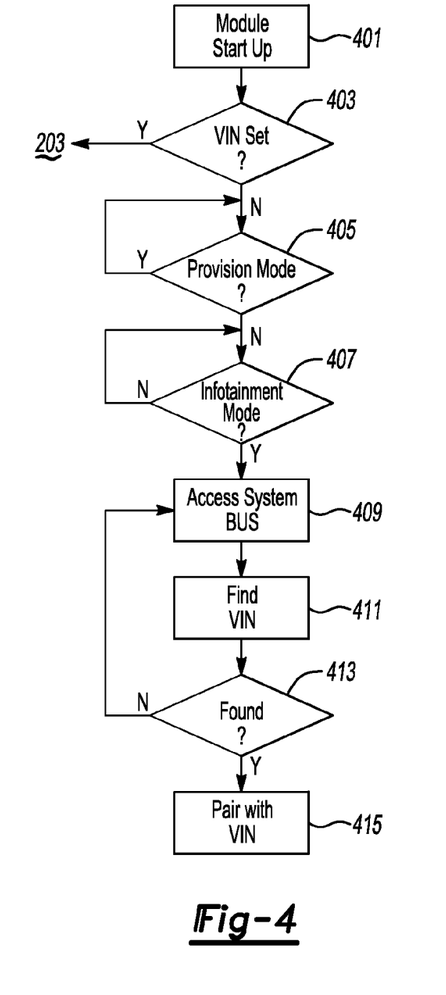
FIG. 4 shows an illustrative example of VIN pairing process.

FIG. 4 shows an illustrative example of VIN pairing process. This is a process that may occur several times during the life of a system, including, but not limited to, upon manufacturing completion, upon authorized sale of the system, upon recovery of the system from a damaged vehicle, etc.

Once the vehicle has been powered, the module may be enabled 401 and determine if a VIN is present and paired with the module currently 403. If a VIN is present, the module may then proceed with a next authorization step 203.

If a VIN pairing is not present, however, the module may determine if the system is in a suitable state to pair with a new VIN. Since the module may be started several times during manufacturing, while the VCS is still being provisioned, it may be desirable to determine if the system is in a provisioning mode before VIN-pairing is attempted 405. This should help prevent inadvertent pairing of a module/system that may be moved to a new vehicle before leaving the factory, and should help prevent an attempt to pair the system in a state when a VIN may not be accessible on a system bus.

If the system is not in provisioning mode 405, the module may further ensure that the system has entered an infotainment mode 407. This indicates that the system is operating in a standard end-user mode, and is not in some form of diagnostic or other mode during which pairing may not be desired.

If all desired criteria (which may include criteria other than those listed here) are met, the module will access a vehicle bus or other information source from which it can obtain the vehicle's VIN 409. The module may then seek out the VIN as electronic information 411.

If the VIN is not found 413, the module may persist in seeking the VIN until such time as a VIN is available. Once the VIN has been found, the module may pair with the VIN and enter an operational mode, for use with that VIN only. At this point, any attempt to place the system in a new vehicle would result in lockout of the system, until such time as the module was instructed to seek out a new VIN and was unlocked by an authorized party.

Figure 5:
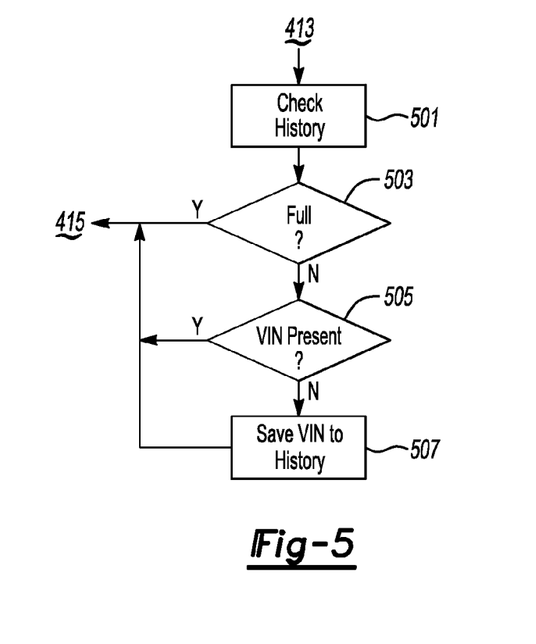
FIG. 5 shows an illustrative example of a VIN recording process.

FIG. 5 shows an illustrative example of a VIN recording process. In at least one illustrative example, VINs with which the module is paired are recorded with respect to a history source, so that reporting of paired VINs can be obtained at a future time. This can help provide a history of what vehicles the module has been paired with, and may further provide information about any unauthorized unlocking of the system. Historical information can also be used to determine which vehicle a module is supposed to be paired with, in the event that a stolen system is recovered.

In at least one embodiment, ten VINs are stored as a maximum, although this can be adjusted as per a manufacturer's desire. Once a new VIN has been detected for pairing 413, the module may check an existing history to determine what VINs have previously been paired with this system 501. The history may be part of a special record that exists on the module and survives module reflashes, preventing attempts to clear a history.

If the history is full 503, the process may proceed to pairing with the current VIN 415. Although the new VIN may not be recorded in the history file, it can still be accessible through reporting from a memory location storing the identity of the currently paired VIN. Additionally, the process may check to see if the VIN of the current vehicle is already stored in the history list 505.

If, for example, a module malfunction caused the system to lock, then there may be no reason to re-save the VIN number upon unlock and re-pairing. In this embodiment, only new, unstored VIN numbers will be saved during the pairing process.

If room remains in the history file, and the VIN is not already present in the file, the module may save the VIN number in the file 507 and then proceed with pairing 415.

In at least one instance, certain aspects of the module may be saved in a device parameter store (DPS). DPS is a special flash area that survives image reflashes of the module, and maintains its values. This may be helpful in preventing a savvy thief from thwarting the module control by attempting to reflash the module. Since the VIN and any lock-state will be saved in the DPS, a reflashed module will still use these variables to determine functionality of the system, and improper usage of the system will still be prevented.

In certain instances, such a system can be included but disabled during production. Only if the system is enabled post-production will it go into effect, otherwise the relevant modules may lay dormant. In at least one embodiment, additional vehicle firmware/software modules may be disabled by this system as well.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
determining, by a processor, that a requested-upload corresponds to a locked vehicle infotainment system (VIS) unlocking procedure;
verifying, by the processor, requested-upload authenticity;
activating, by the processor, the requested-upload to unlock the VIS;
responsive to the unlocking, deleting, by the processor, a vehicle identification number (VIN) associated with the locked VIS;
obtaining, by the processor, a new VIN, from a vehicle containing the VIS, for VIS association; and
saving, by the processor, the new VIN as a VIN which must be detected upon startup to prevent VIS relocking.

2. The method of claim 1, wherein the verifying includes verifying an electronic serial number (ESN) associated with the requested-upload.

3. The method of claim 2, wherein the verifying includes ensuring that the ESN of the requested-upload is the same as an ESN associated with the locked VIS.

4. The method of claim 1, wherein the VIN is obtained from a vehicle bus.

5. A system comprising:
a processor configured to:
determine a requested-upload corresponds to a locked vehicle infotainment system (VIS) unlocking procedure;
verify requested-upload authenticity;
activate requested-upload to unlock the VIS;
responsive to the unlocking, delete a vehicle identification number (VIN) associated with the locked VIS;
obtain a new VIN, from a vehicle containing the VIS, for VIS association; and
save the new VIN as a VIN which must be detected upon startup to prevent VIS relocking.

6. The system of claim 5, wherein the verifying includes verifying an electronic serial number (ESN) associated with the requested-upload.

7. The system of claim 6, wherein the processor is configured to ensure that the ESN of the requested-upload is the same as an ESN associated with the locked VIS.

8. The system of claim 5, wherein the VIN is obtained from a vehicle bus.

9. A non-transitory, computer readable storage medium, storing instructions, that, when executed by a processor, cause the processor to perform a method comprising:
determining that a requested-upload corresponds to a locked vehicle infotainment system (VIS) unlocking procedure;
verifying requested-upload authenticity;
activating the requested-upload to unlock the VIS;
responsive to the unlocking, deleting a vehicle identification number (VIN) associated with the locked VIS;
obtaining a new VIN, from a vehicle containing the VIS, for VIS association; and
saving the new VIN as a VIN which must be detected upon startup to prevent VIS relocking.

10. The storage medium of claim 9, wherein the verifying includes verifying an electronic serial number (ESN) associated with the requested-upload.

11. The storage medium of claim 10, wherein the verifying includes ensuring that the ESN of the requested-upload is the same as an ESN associated with the locked VIS.

12. The storage medium of claim 9, wherein the VIN is obtained from a vehicle bus.

* * * * *